(12) United States Patent
Zheng et al.

(10) Patent No.: US 9,160,391 B2
(45) Date of Patent: Oct. 13, 2015

(54) MOBILE PHONE AND DATA PROCESSING METHOD THEREOF

(75) Inventors: Yu Zheng, Huizhou (CN); Yang Ding, Huizhou (CN)

(73) Assignee: HUIZHOU TCL MOBILE COMMUNICATION CO., LTD., Huizhou City, Guangdong Province (CN)

( * ) Notice: Subject to any disclaimer, the term of this patent is extended or adjusted under 35 U.S.C. 154(b) by 135 days.

(21) Appl. No.: 13/979,655

(22) PCT Filed: Dec. 7, 2011

(86) PCT No.: PCT/CN2011/083607
§ 371 (c)(1),
(2), (4) Date: Jul. 15, 2013

(87) PCT Pub. No.: WO2012/119470
PCT Pub. Date: Sep. 13, 2012

(65) Prior Publication Data
US 2013/0288751 A1    Oct. 31, 2013

(30) Foreign Application Priority Data

Mar. 10, 2011   (CN) .......................... 2011 1 0057747

(51) Int. Cl.
| H04B 1/38 | (2015.01) |
| H04B 1/3816 | (2015.01) |
| H04M 1/2745 | (2006.01) |
| H04W 8/18 | (2009.01) |
| H04W 12/06 | (2009.01) |
| H04W 12/08 | (2009.01) |

(52) U.S. Cl.
CPC ....... *H04B 1/3816* (2013.01); *H04M 1/274516* (2013.01); *H04W 8/183* (2013.01); *H04W 12/06* (2013.01); *H04W 12/08* (2013.01)

(58) Field of Classification Search
CPC ....... H04W 12/06; H04W 12/08; H04W 8/18; H04W 8/20; H04W 48/18; H04W 24/02; H04W 52/0209; H04B 1/3816; H04L 63/0853
See application file for complete search history.

(56) References Cited

U.S. PATENT DOCUMENTS

| 5,913,175 | A | 6/1999 | Pinault | |
| 8,474,050 | B2 * | 6/2013 | Casimere et al. | 726/26 |
| 8,483,661 | B2 * | 7/2013 | Dehlinger et al. | 455/411 |
| 2002/0154632 | A1 * | 10/2002 | Wang et al. | 370/389 |
| 2006/0089172 | A1 * | 4/2006 | Kim | 455/558 |

(Continued)

FOREIGN PATENT DOCUMENTS

| CN | 1606373 A | 4/2005 |
| CN | 1984409 A | 6/2007 |

(Continued)

*Primary Examiner* — Kashif Siddiqui
*Assistant Examiner* — Minjung Kim
(74) *Attorney, Agent, or Firm* — Cheng-Ju Chiang

(57) ABSTRACT

A mobile phone and a data processing method thereof are disclosed. The method comprises: reading an ID of a secondary SIM card and determining whether the secondary SIM card is locked out if the secondary SIM card is locked out, then determining whether to copy data of the secondary SIM card according to a user's choice; and if the user chooses to copy the data of the secondary SIM card, then copying the data of the secondary SIM card to the mobile phone or to the primary SIM card of the mobile phone, or to both the mobile phone and the primary SIM card of the mobile phone.

19 Claims, 2 Drawing Sheets

(56) References Cited

U.S. PATENT DOCUMENTS

| | | | |
|---|---|---|---|
| 2008/0109656 A1* | 5/2008 | Kotzin | 713/165 |
| 2008/0113651 A1* | 5/2008 | Choi | 455/411 |
| 2010/0048169 A1* | 2/2010 | Yan et al. | 455/411 |
| 2012/0135715 A1* | 5/2012 | Kang et al. | 455/412.1 |
| 2013/0040618 A1* | 2/2013 | D'amato et al. | 455/414.1 |

FOREIGN PATENT DOCUMENTS

| | | |
|---|---|---|
| CN | 101252756 A | 8/2008 |
| CN | 101977263 A | 2/2011 |
| CN | 102137388 A | 7/2011 |
| CN | 102137389 A | 7/2011 |

* cited by examiner

MOBILE PHONE AND DATA PROCESSING METHOD THEREOF

CROSS REFERENCE TO RELATED APPLICATIONS

The present application is a 35 U.S.C. §371 National Phase conversion of International (PCT) Patent Application No. PCT/CN2011/083607, filed on Dec. 7, 2011, the disclosure of which is incorporated by reference herein. The PCT International Patent Application was published in Chinese.

FIELD OF THE INVENTION

The present disclosure generally relates to the technical field of communication, and more particularly, to a mobile phone and a data processing method thereof.

BACKGROUND OF THE INVENTION

With continuous advancement of mobile terminal technologies, users now demand for more and more functions of mobile terminals.

Take Subscriber Identity Module (SIM) cards as an example. For the SMI cards currently available, communication operators generally have an absolute control over mobile phones they purchased. Therefore, the operators usually adopt the SIMLock technology to restrict users from using SIM cards of other operators in the mobile phones. For example, mobile phones customized for China Unicom do not allow for use of SIM cards of China Mobile Communication Corporation therein.

In terms of physical hardware, a primary SIM card slot and a secondary SIM card slot are defined in each mobile terminal. The mobile terminal operates normally, only when an SIM card complying with the SIMLock specification is inserted in the primary SIM card slot. When no primary SIM card complying with the specification is inserted in the primary SIM card slot, the mobile terminal will be locked out even if an SIM card complying with the specification is inserted in the secondary SIM card slot.

The SIMLock technology is implemented on the basis of a white list of operators which is built in the mobile terminal, i.e., a list of Mobile Country codes (MCCs) and Mobile Network Codes (MNCs) recognized and specified by the operator. The MCC resource is allocated and managed uniformly by the International Telecommunication Union (ITU) to uniquely identify a country to which a mobile subscriber belongs, and an MCC code has three bits ("460" for China). An MNC code has two bits and is used to identify a network to which the mobile subscriber belongs. For SIM cards which are not listed in the white list, functions will be restricted: for example, dialing a phone number and sending a short message are forbidden, or even the mobile phone is locked out directly.

Although the dual-card-dual-standby and multi-card-multi-standby technologies have appeared, there still lacks a thorough understanding by the operators on how to effectively utilize such technologies. Currently, practices of controlling functions within a mobile phone are all based on the SIMLock specification of the standard 3GPP/3GPP2 (3$^{rd}$ Generation Partnership Project 2), and all resources of a mobile phone are treated uniformly: either all functions are allowed to be used by the user or only an emergency call can be made.

Obviously, it is impossible for the user to dial a phone number or send a short message through use of the telephone directory on the secondary SIM card when the secondary SIM card is locked out. This greatly restricts the use of the mobile phone and represents great inconveniences to the user.

SUMMARY OF THE INVENTION

An objective of embodiments of the present disclosure is to provide a mobile phone and a data processing method thereof, which allow a user to use a telephone directory of a secondary SIM card even if the secondary SIM card is locked out.

The present disclosure provides a data processing method for a mobile phone, which comprises the following steps of: reading an identity (ID) of a primary subscriber identity module (SIM) card, and comparing the ID of the primary SIM card with pre-stored determination data to determine whether the primary SIM card is available for use; if the primary SIM card is unavailable for use, then locking out the mobile phone and prompting a user to input unlocking information; if the primary SIM card is available for use, then reading an ID of a secondary SIM card and comparing the ID of the secondary SIM card with the pre-stored determination data to determine whether the secondary SIM card is locked out; if the secondary SIM card is locked out, then determining whether to copy data of the secondary SIM card according to a user's choice; and if the user chooses to copy the data of the secondary SIM card, then copying the data of the secondary SIM card to the mobile phone, or to the primary SIM card of the mobile phone, or to both the mobile phone and the primary SIM card of the mobile phone.

According to a preferred embodiment of the present disclosure, both the ID of the primary SIM card and the ID of the secondary SIM card are mobile country codes (MCCs) and mobile network codes (MNCs).

The present disclosure provides a data processing method for a mobile phone, which comprises the following steps of: reading an ID of a secondary SIM card and determining whether the secondary SIM card is locked out; if the secondary SIM card is locked out, then determining whether to copy data of the secondary SIM card according to a user's choice; and if the user chooses to copy the data of the secondary SIM card, then copying the data of the secondary SIM card to the mobile phone, or to a primary SIM card of the mobile phone, or to both the mobile phone and the primary SIM card of the mobile phone.

According to a preferred embodiment of the present disclosure, the data processing method for a mobile phone further comprises the following step after the step of copying the data of the secondary SIM card to the mobile phone: labeling the data copied to the mobile phone as being from the secondary SIM card.

According to a preferred embodiment of the present disclosure, the data processing method for a mobile phone further comprises the following steps before the step of reading an ID of a secondary SIM card: reading an ID of a primary SIM card, and determining whether the primary SIM card is available for use; if the primary SIM card is unavailable for use, then locking out the mobile phone and prompting the user to input unlocking information; and if the primary SIM card is available for use, then proceeding to the step of reading an ID of a secondary SIM card.

According to a preferred embodiment of the present disclosure, the step of determining whether the primary SIM card is available for use comprises the following step of: comparing the ID of the primary SIM card with pre-stored determination data.

According to a preferred embodiment of the present disclosure, the ID of the primary SIM card is a mobile country code (MCC) and a mobile network code (MNC).

According to a preferred embodiment of the present disclosure, the step of determining whether the secondary SIM card is locked out comprises the following step of: comparing the ID of the secondary SIM card with the pre-stored determination data.

According to a preferred embodiment of the present disclosure, the ID of the secondary SIM card is a mobile country code (MCC) and a mobile network code (MNC).

The present disclosure provides a mobile phone, which comprises: an SIM card determining module, being configured to read an ID of a secondary SIM card and determine whether the secondary SIM card is locked out; a data processing determining module, being configured to determine whether to copy data of the secondary SIM card according to a user's choice; and a data processing module, being configured to copy the data of the secondary SIM card to the mobile phone, or to a primary SIM card of the mobile phone, or to both the mobile phone and the primary SIM card of the mobile phone when the user chooses to copy the data of the secondary SIM card.

According to a preferred embodiment of the present disclosure, the mobile phone further comprises: a labeling module, being configured to label the data copied to the mobile phone as being from the secondary SIM card.

According to a preferred embodiment of the present disclosure, the SIM card determining module is further configured to read an ID of a primary SIM card and determine whether the primary SIM card is available for use; and the mobile phone further comprises an information prompting module which is configured to, if the primary SIM card is unavailable for use, lock out the mobile phone and prompt the user to input unlocking information.

According to a preferred embodiment of the present disclosure, both the ID of the primary SIM card and the ID of the secondary SIM card are mobile country codes (MCCs) and mobile network codes (MNCs).

According to the embodiments described above, the present disclosure allows data such as the telephone directory on the secondary SIM card to be copied to the mobile phone or to the primary SIM card of the mobile phone. Therefore, the problem that the user cannot dial a phone number or send a short message through use of the telephone directory of the secondary SIM card when the secondary SIM card is locked out is solved. This represents great conveniences to the user and facilitates the popularization of services provided by mobile operators.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts. In the attached drawings.

DETAILED DESCRIPTION OF THE INVENTION

To make the objectives, technical solutions and advantages of the present disclosure clearer, the present disclosure will be further described hereinbelow with reference to the attached drawings and embodiments thereof. It shall be understood that, the embodiments described herein are only intended to illustrate but not to limit the present disclosure.

Figure 1:
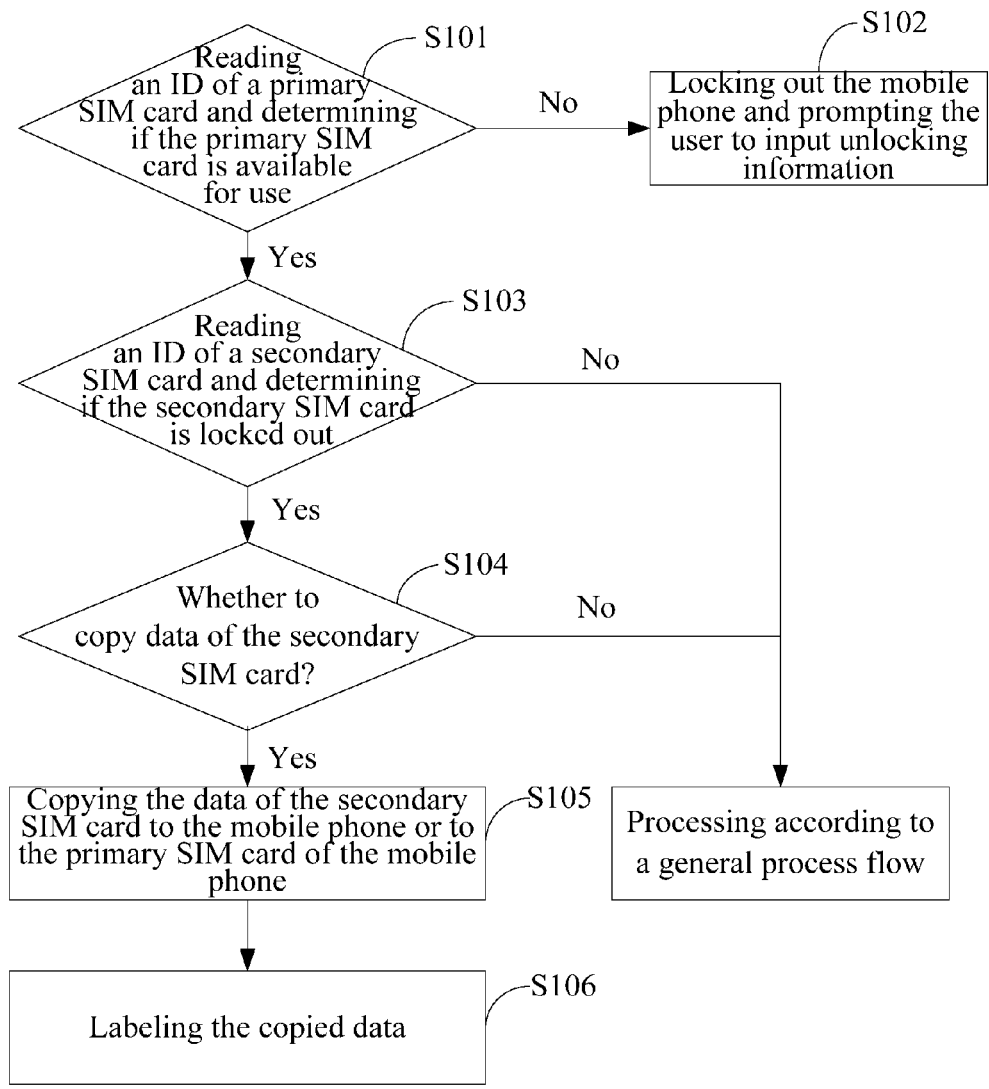
FIG. 1 is a schematic flowchart diagram of a data processing method for a mobile phone according to an embodiment of the present disclosure.

FIG. 1 illustrates a flowchart diagram of a data processing method for a mobile phone according to an embodiment of the present disclosure.

In step S101, an ID of a primary SIM card is read to determine whether the primary SIM card is available for use. If the primary SIM card is unavailable for use, then the process proceeds to step S102; and otherwise, the process proceeds to step S103.

In practical implementations of the present disclosure, in the step of determining whether the primary SIM card is available for use, the ID of the primary SIM card is compared with pre-stored determination data, i.e., the MCC and the MNC of the primary SIM card is compared with a white list pre-stored in the mobile phone. If there exists data which is consistent with the MCC and the MNC of the primary SIM card in the white list, then it is determined that the primary SIM card is available for use.

Of course, if there is more than one primary SIM card in the mobile phone, then the above determining step is executed once for each of the primary SIM cards.

In step S102, a general SIMlock process flow is carried out to lock out the mobile phone and prompt a user to input unlocking information.

In step S103, an ID of a secondary SIM card is read to determine whether the secondary SIM card is locked out. If the secondary SIM card is locked out, then the process proceeds to step S104; and otherwise, a normal process flow is followed (i.e., performing corresponding operations such as dialing a phone number or sending a short message through use of the secondary SIM card).

In practical implementations of the present disclosure, in the step of determining whether the secondary SIM card is locked out, the ID of the secondary SIM card is compared with the pre-stored determination data, i.e., the MCC and the MNC read from the secondary SIM card is compared with the determination data in the white list. If there exists data which is consistent with the MCC and the MNC of the secondary SIM card in the white list, then it is determined that the secondary SIM card is not locked out; and otherwise, it is determined that the secondary SIM card is locked out.

In step S104, it is determined whether to copy data of the secondary SIM card according to a user's choice. If the answer is yes, then the process proceeds to step S105; and otherwise, the normal process flow is followed.

In step S105, the data of the secondary SIM card is copied to the mobile phone, or to the primary SIM card of the mobile phone, or to both the mobile phone and the primary SIM card of the mobile phone.

In step S106, the data copied to the mobile phone is labeled as being from the secondary SIM card.

In practical implementations, if there is more than one secondary SIM card in the mobile phone, then step S103 is repeated.

Preferably, both the ID of the primary SIM card and the ID of the secondary SIM card are mobile network codes (MNCs) and mobile country codes (MCCs). Of course, they may also be other IDs, which will not be further described herein.

Obviously, by the steps described above, the problem that the user cannot dial a phone number or send a short message through use of the telephone directory of the secondary SIM card when the secondary SIM card is locked out is solved by the present disclosure.

Figure 2:
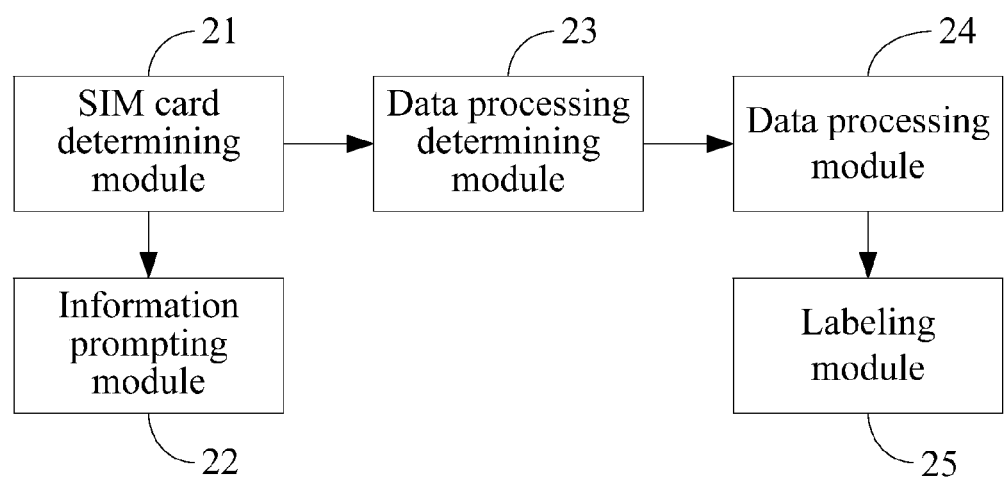
FIG. 2 is a functional block diagram of a mobile phone according to an embodiment of the present disclosure.

FIG. 2 illustrates a structure of a mobile phone according to an embodiment of the present disclosure.

An SIM card determining module 21 reads an ID of a primary SIM card and determines whether the primary SIM card is available for use.

If the primary SIM card is unavailable for use, then an information prompting module 22 locks out the mobile phone and prompts a user to input unlocking information.

If the primary SIM card is available for use, then the SIM card determining module 21 reads an ID of a secondary SIM card and determines whether the secondary SIM card is locked out.

If the secondary SIM card is not locked out, then the process is performed according to the normal flow path; and otherwise, the information prompting module 22 prompts the user of this. A data processing determining module 23 determines whether to copy data of the secondary SIM card according to a user's choice.

If the user chooses to copy the data of the secondary SIM card, then a data processing module 24 copies the data of the secondary SIM card to the mobile phone or to the primary SIM card of the mobile phone.

A labeling module 25 labels the data copied to the mobile phone as being from the secondary SIM card.

Preferably, both the ID of the primary SIM card and the ID of the secondary SIM card are mobile country codes (MCCs) and mobile network codes (MNCs). Of course, they may also be other IDs, which will not be further described herein.

Accordingly, the problem that the user cannot dial a phone number or send a short message through use of the telephone directory of the secondary SIM card when the secondary SIM card is locked out is solved by the present disclosure. This represents great conveniences to the user and facilitates the popularization of services provided by mobile operators.

What described above are only some of the embodiments of the present disclosure, but are not intended to limit the scope of the present disclosure. Any changes, equivalent substitutions and modifications that are made within the spirits and principles of the present disclosure shall all be covered within the scope of the present disclosure.

What is claimed is:

1. A data processing method for a mobile phone, comprising the following steps of:
    reading an identity (ID) of a primary subscriber identity module (SIM) card, and comparing the ID of the primary SIM card with pre-stored determination data to determine whether the primary SIM card is available for use;
    when the primary SIM card is unavailable for use, then locking out the mobile phone and prompting a user to input unlocking information;
    when the primary SIM card is available for use, then reading an ID of a secondary SIM card and comparing the ID of the secondary SIM card with the pre-stored determination data to determine whether the secondary SIM card is locked out;
    when the secondary SIM card is locked out, then determining whether to copy data of the secondary SIM card according to a user's choice; and
    when the user chooses to copy the data of the secondary SIM card, then copying the data of the secondary SIM card to the mobile phone, or to the primary SIM card of the mobile phone, or to both the mobile phone and the primary SIM card of the mobile phone.

2. The data processing method for a mobile phone of claim 1, wherein both the ID of the primary SIM card and the ID of the secondary SIM card are mobile country codes (MCCs) and mobile network codes (MNCs).

3. A data processing method for a mobile phone, comprising the following steps of:
    reading an ID of a secondary SIM card and determining whether the secondary SIM card is locked out;
    when the secondary SIM card is locked out, then determining whether to copy data of the secondary SIM card according to a user's choice; and
    when the user chooses to copy the data of the secondary SIM card, then copying the data of the secondary SIM card to the mobile phone, or to a primary SIM card of the mobile phone, or to both the mobile phone and the primary SIM card of the mobile phone.

4. The data processing method for a mobile phone of claim 3, further comprising the following step after the step of copying the data of the secondary SIM card to the mobile phone:
    labeling the data copied to the mobile phone as being from the secondary SIM card.

5. The data processing method for a mobile phone of claim 3, further comprising the following steps before the step of reading an ID of a secondary SIM card:
    reading an ID of a primary SIM card, and determining whether the primary SIM card is available for use;
    when the primary SIM card is unavailable for use, then locking out the mobile phone and prompting the user to input unlocking information; and
    when the primary SIM card is available for use, then proceeding to the step of reading the ID of the secondary SIM card.

6. The data processing method for a mobile phone of claim 5, wherein the step of determining whether the primary SIM card is available for use comprises the following step of:
    comparing the ID of the primary SIM card with pre-stored determination data.

7. The data processing method for a mobile phone of claim 6, wherein the ID of the primary SIM card is a mobile country code (MCC) and a mobile network code (MNC).

8. The data processing method for a mobile phone of claim 3, wherein the step of determining whether the secondary SIM card is locked out comprises the following step of:
    comparing the ID of the secondary SIM card with pre-stored determination data.

9. The data processing method for a mobile phone of claim 8, wherein the ID of the secondary SIM card is a mobile country code (MCC) and a mobile network code (MNC).

10. A mobile phone, comprising:
    an SIM (subscriber identity module) card determining module, being configured to read an ID (identity) of a secondary SIM card and determine whether the secondary SIM card is locked out;
    a data processing determining module, being configured to determine whether to copy data of the secondary SIM card according to a user's choice; and
    a data processing module, being configured to copy the data of the secondary SIM card to the mobile phone, or to a primary SIM card of the mobile phone, or to both the mobile phone and the primary SIM card of the mobile phone when the user chooses to copy the data of the secondary SIM card, wherein the data of the secondary SIM card comprises a telephone directory, dialing a phone number or sending a short message through use of the telephone directory of the secondary SIM card is performed by using the primary SIM card when the secondary SIM card is locked out.

11. The mobile phone of claim 10, further comprising:
a labeling module, being configured to label the data copied to the mobile phone as being from the secondary SIM card.

12. The mobile phone of claim 10, wherein:
the SIM card determining module is further configured to read an ID of a primary SIM card and determine whether the primary SIM card is available for use; and
the mobile phone further comprises an information prompting module which is configured to, when the primary SIM card is unavailable for use, lock out the mobile phone and prompt the user to input unlocking information.

13. The mobile phone of claim 10, wherein both the ID of the primary SIM card and the ID of the secondary SIM card are mobile country codes (MCCs) and mobile network codes (MNCs).

14. The data processing method for a mobile phone of claim 1, wherein the data of the secondary SIM card comprises a telephone directory, dialing a phone number or sending a short message through use of the telephone directory of the secondary SIM card is performed by using the primary SIM card when the secondary SIM card is locked out.

15. The data processing method for a mobile phone of claim 2, wherein in the step of determining whether the secondary SIM card is locked out, the ID of the secondary SIM card is compared with the pre-stored determination data.

16. The data processing method for a mobile phone of claim 15, wherein the MCCs and the MNCs read from the secondary SIM card are compared with the determination data in a white list pre-stored in the mobile phone, when there exists data which is consistent with the MCCs and the MNCs of the secondary SIM card in the white list, then it is determined that the secondary SIM card is not locked out; and otherwise, it is determined that the secondary SIM card is locked out.

17. The data processing method for a mobile phone of claim 3, wherein the data of the secondary SIM card comprises a telephone directory, dialing a phone number or sending a short message through use of the telephone directory of the secondary SIM card is performed by using the primary SIM card when the secondary SIM card is locked out.

18. The data processing method for a mobile phone of claim 7, wherein in the step of determining whether the secondary SIM card is locked out, the ID of the secondary SIM card is compared with the pre-stored determination data.

19. The data processing method for a mobile phone of claim 18, wherein the MCC and the MNC read from the secondary SIM card are compared with the determination data in a white list pre-stored in the mobile phone, when there exists data which is consistent with the MCC and the MNC of the secondary SIM card in the white list, then it is determined that the secondary SIM card is not locked out; and otherwise, it is determined that the secondary SIM card is locked out.

* * * * *